June 11, 1935.  H. B. SHOEMAKER  2,004,298
UNIVERSAL JOINT
Filed June 28, 1934
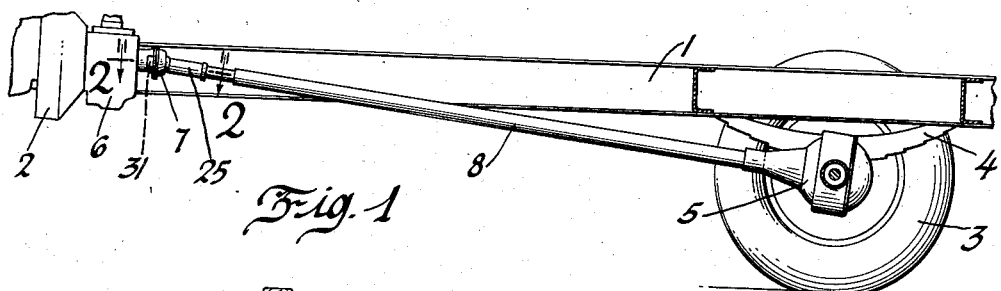
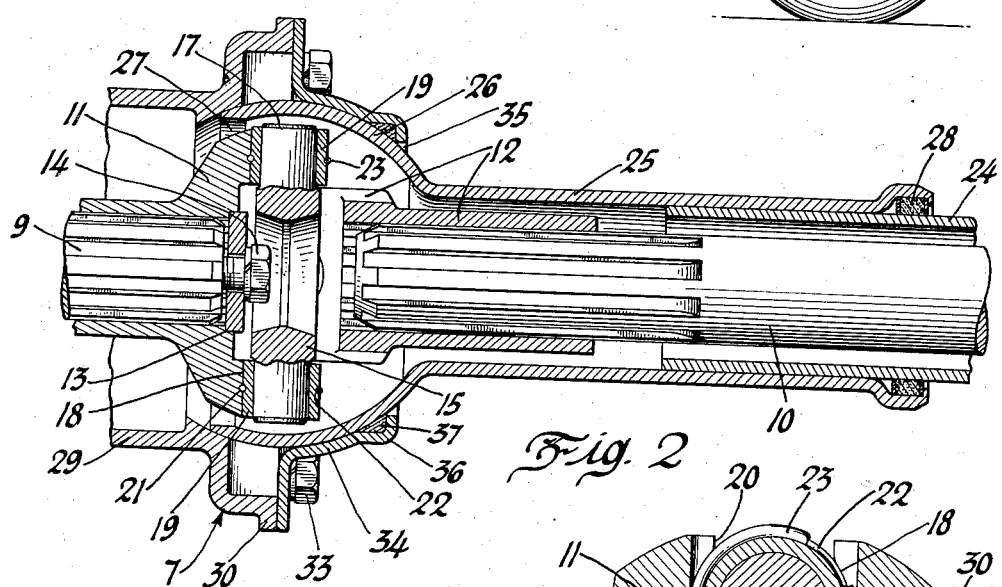
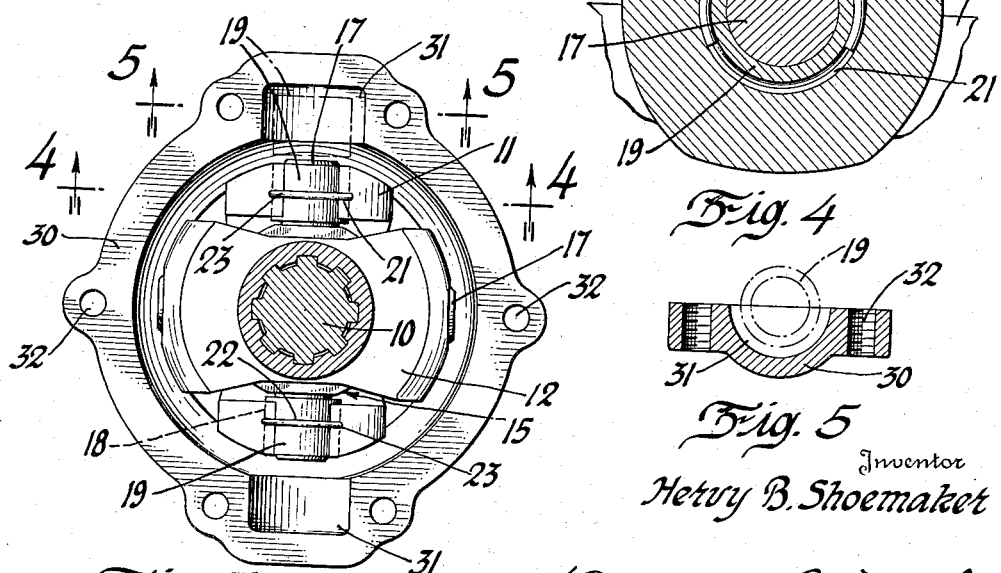
Inventor
Henry B. Shoemaker
By Blackmore, Spencer & Hind
Attorney Patented June 11, 1935

2,004,298

UNITED STATES PATENT OFFICE 2,004,298

UNIVERSAL JOINT

Hervy B. Shoemaker, Detroit, Mich., assignor to General Motors Corporation, Detroit, Mich., a corporation of Delaware Application June 28, 1934, Serial No. 732,746

7 Claims. (Cl. 64—89)

This invention relates to improvements in encased universal joints and particularly to improved means for disassembling the universal joint in an automotive vehicle without the necessity of disconnecting the rear axle and wheels and obtain endwise movement of the shaft.

It has heretofore been necessary, when it was desired to remove a universal joint, to remove the rear axle and wheels from contact with the remainder of the vehicle so that the two yoke members on the ends of the shafts might be separated from the spider which connected them.

It is the object of this invention to provide a structure of such form that it may be taken apart as a unit without disassembling any other portion of the vehicle. More specifically, the object is to provide openings or pockets in the casing which encloses the universal joint and into which the bushings surrounding the ends of the spider studs may be moved from their normal position to allow the yoke on the end of the shaft to be disconnected from the spider of the universal.

In the accompanying drawing, illustrating one embodiment of my invention:

Fig. 1 shows a vertical longitudinal section through the portion of an automotive vehicle from the rear of the motor to the rear wheels.

Fig. 2 shows an enlarged detail cross section taken on the line 2—2 of Fig. 1.

Fig. 3 is a full face view of the universal joint looking from the right in Fig. 2 with the rear portions of the enclosing casing removed.

Fig. 4 is an enlarged partial sectional view taken on lines 4—4 of Fig. 3.

Fig. 5 is a sectional view taken on the lines 5—5 of Fig. 3.

Referring specifically to Fig. 1, the numeral 1 indicates the frame of a motor vehicle which supports, at its forward end, a motor 2 for driving the same. At the rear, wheel 3 is connected to the frame 1 by leaf spring 4. Upon the same axle as the rear wheel 3 is supported is located the differential 5 in which are located the driving gears for the rear wheels. To the rear of the motor is connected a transmission 6 and to the rear of that a universal joint connection 7. Between the rear driving connection of the universal joint and the differential 5 is connected the torque tube 8.

Referring now in detail to the universal joint connection indicated broadly at 7 and as shown in detail in Fig 2, the two shafts to be connected are indicated at 9 and 10. The shaft 9 is a stub shaft projecting from the transmission 6, and 10 is the propeller shaft. Both shafts have a series of ridges and grooves around the circumference at the ends and the yokes 11 and 12 are machined complementarily to fit thereon respectively for a strong driving connection.

The yoke 11 is secured to the end of shaft 9 by washer 13 which is held by cap screw 14 threaded into the end of shaft 9. The yoke 12 is slidably secured to shaft 10 and fits at right angles into the opening of yoke 11. The two yokes are fastened together by a spider 15 which has four arms, the adjacent arms being at right angles to each other and the ends forming studs as shown at 17. The ends of the yoke members 11 and 12 have formed in them, circular openings 18 in which bushings 19 are secured in a manner to be later described. These circular openings 18 are slotted as at 20 to a width less than the outside diameter of the bushings but greater than the outside diameter of the studs 17.

In the approximate medial portion of the circular opening and slotted portion is formed a groove 21 of semi-circular form. Also in the exterior surface of the bushing at its mid-point is a semi-circular groove 22. The purpose of these two grooves is to secure the bushing within the opening in the yoke. The bushings are forced into the openings in an axial direction and when the two semi-circular grooves coincide, a wire 23 is pushed around through the opening so formed, and this prevents any longitudinal movement of the bushing.

Surrounding the propeller shaft 10 is the torque tube 24. Fitted on the torque tube is the torque ball sleeve 25 which has an enlarged spherical portion 26 at one end to enclose the universal joint and which has an opening 27 in the end thereof of sufficient size to allow the joint per se to pass through. This torque ball sleeve is slidable on the torque tube and a washer 28 is supplied at the rearward extremity of the sleeve between that and the tube to prevent lubricant leakage.

A portion of the casing of the transmission housing is extended rearwardly, as shown at 29, which has a flange 30 at its extremity. In the housing, set slightly back from the flange, are two semi-cylindrical cavities, or pockets 31, at axially opposed points as best shown in Figs. 3 and 5. These cavities are directly in line with the bushings in the yoke member when that yoke member is in a particular position. The flange also has a series of bolt holes 32 throughout its periphery into which the cap screws 33 are threaded to secure the semi-spherical member 34 thereto. The member 34 completes the outside protective casing assembly and has an opening 35 in the rear face which allows the torque tube sleeve to project through. Adjacent this opening a ridged or notched section 36 is formed in member 34 which is filled with packing material 37 to keep the dust and dirt from entering the joint and the lubricant therein from escaping.

It has heretofore been necessary when disassembling a universal joint to disconnect the rear axle from the springs or the springs from the frame so that the shaft, such as 10, might be pulled out to the rear from a yoke member, such as 12. Then a long socket wrench was applied to remove a cap screw, such as 14, and take the joint apart. The bushings on the yoke arms could not be removed as the casing was in the way and therefore the universal joint itself could not be taken apart until it was removed from the vehicle. But this joint may be disconnected in the following manner: the cap screws 33 are taken out first which allows the member 34 to be slid back along the torque ball sleeve and also permits the torque ball sleeve to be pushed to the rear on the torque tube. This will expose the universal joint per se. The wires 23 are next removed which allows the two bushings which happen to be in position to be moved respectively into the cavities or pockets in the casing 30. The studs on the spider may then be moved through the openings 20 and will do so as the yoke member 12 is pushed back on the propeller shaft. This allows the forward end of the propeller shaft to be dropped down thereby permitting the application of a socket wrench to the cap screw 14 to remove that and allow yoke 11 to be taken off. The assembly, of course, would be merely the reverse of the above.

It can therefore be seen that I have provided a universal joint that may be disassembled without the necessity of disconnecting the rear axle and wheels from the chassis of the vehicle.

I claim:

1. In a universal joint assembly having two yokes attached to the ends of the shafts and a spider for connecting the two, openings in the yokes to receive the ends of the spider arms, bushings in said openings, a two piece casing for surrounding the joint, one of the sections of said casing having two pockets on an axis in the plane of rotation of the spider, whereby the two opposite bushings may be moved into said pockets to facilitate disassembly of the joint.

2. In a universal joint, two shafts, a yoke attached to the end of each, a spider having arms to connect with the yokes, openings in each yoke for the insertion of the spider arms, a bushing in each opening, a casing surrounding the joint composed of two sections, one section being slidable along the axis of the shaft, the second section having two pockets on an axis in the plane of rotation whereby the bushings may be moved into the pockets to facilitate disassembly of the joint.

3. A casing for surrounding a universal joint structure comprising a torque tube surrounding a shaft, a torque ball sleeve slidable on the tube and having an enlarged end portion which surrounds the joint, a casing fitting outside of the torque ball sleeve and contacting the enlarged portion having two sections, one of which has two alined pockets therein in the plane of rotation of the joint whereby parts of the joint may be moved into these pockets to facilitate disassembly.

4. A universal joint comprising two shafts, a yoke rigidly secured to the end of one shaft, a second yoke slidable axially on the end of the second shaft, diametrically alined openings in the arms of each yoke, bushings detachably secured within the openings, a spider for connecting the yokes together through contact with the openings, a torque tube surrounding one shaft, a torque sleeve ball slidably mounted on the tube and having an enlarged end portion which encompasses the joint, a casing having two sections contacting the outside surface of said enlarged end to seal the joint, one of said sections have two alined pockets whereby when the torque sleeve ball is moved along the tube the bushings may be moved into the pockets to facilitate disassembly.

5. A universal joint comprising two shafts, a yoke rigidly secured to the end of one shaft, a second yoke slidable axially on the end of the second shaft, diametrically alined openings in the arms of each yoke, said openings being slotted, bushings detachably secured within the openings, a spider having arms for engaging the bushings to connect the yokes together, the slots in the openings being smaller than the outside diameter of the bushings but larger than the outside diameter of the spider arms, a casing surrounding the joint composed of two sections, one section having two alined pockets on an axis in the plane of rotation of the joint, whereby the bushings may be moved axially into the pockets and the yoke member slipped laterally from the spider arms, due to the slotted openings, to facilitate disassembly of the joint.

6. In a universal joint assembly having yokes, a spider and radially movable bushings in the yokes engaging the spider arms, a casing surrounding the joint assembly and a pair of pockets in the casing in the plane of the spider into which the bushings may be moved radially to allow the joint to separate.

7. In a universal joint assembly, two shafts, a yoke attached to the end of each, means to which the yoke arms are connected, lining means between the connecting means and the yoke arms, a casing surrounding the assembly and pockets in the casing into which the lining means may be radially moved to facilitate disassembly of the joint.

HERVY B. SHOEMAKER.